United States Patent [19]
Smith

[11] Patent Number: 5,120,159
[45] Date of Patent: Jun. 9, 1992

[54] OIL CONTAINMENT SYSTEM FOR EMERGENCY USE

[75] Inventor: Richard D. Smith, Natick, Mass.

[73] Assignee: Black Stone Trust, Framingham, Mass.

[21] Appl. No.: 674,878

[22] Filed: Mar. 25, 1991

Related U.S. Application Data

[63] Continuation-in-part of Ser. No. 546,392, Jun. 29, 1990, Pat. No. 5,002,430, which is a continuation-in-part of Ser. No. 458,898, Dec. 29, 1989, Pat. No. 4,998,845.

[51] Int. Cl.$^5$ .............................................. E02B 15/06
[52] U.S. Cl. ........................................ 405/66; 405/63; 405/67; 114/360
[58] Field of Search .................... 405/63, 64, 65, 66, 405/67, 68, 69; 114/68, 69, 240 B, 360

[56] References Cited

U.S. PATENT DOCUMENTS

| | | | |
|---|---|---|---|
| 1,283,345 | 10/1918 | Sova | 114/68 |
| 2,342,773 | 2/1944 | Wellman | 405/68 X |
| 3,631,679 | 1/1972 | Fisch | 405/68 |
| 3,665,713 | 5/1972 | Rath | 61/1 F |
| 3,925,991 | 12/1975 | Poche | 61/1 F |
| 3,943,720 | 3/1976 | Milgram | 61/1 F |
| 3,952,350 | 4/1976 | Mouka | 114/68 X |
| 3,963,617 | 6/1976 | Kirk et al. | 210/242 S |
| 3,973,406 | 8/1976 | Casey | 61/1 F |
| 3,984,987 | 10/1976 | Light | 61/1 F |
| 4,006,082 | 2/1977 | Irons | 210/83 |
| 4,014,795 | 3/1977 | in'tVeld | 210/242 R |
| 4,078,513 | 3/1978 | Dorsch | 114/244 |
| 4,106,303 | 8/1978 | Shimada et al. | 61/101 |
| 4,112,689 | 9/1978 | Webb | 405/63 |
| 4,124,981 | 11/1978 | Preus | 405/66 |
| 4,133,765 | 1/1979 | Stupica | 210/242 |
| 4,146,344 | 3/1979 | Steen et al. | 405/68 |
| 4,188,155 | 2/1980 | Langermann | 405/63 |
| 4,207,191 | 6/1980 | Webb | 210/242 |
| 4,249,834 | 2/1981 | Bouvier | 405/70 |
| 4,269,538 | 5/1981 | Hauan | 405/63 |
| 4,310,415 | 1/1982 | Webb | 210/242.3 |
| 4,325,826 | 4/1982 | van Waveren et al. | 210/776 |
| 4,330,223 | 5/1982 | Webb | 405/63 |
| 4,342,655 | 8/1982 | Webb | 210/749 |
| 4,356,094 | 10/1982 | Ross | 210/774 |
| 4,422,797 | 12/1983 | McAllister et al. | 405/70 |
| 4,425,053 | 1/1984 | Muto et al. | 405/63 |
| 4,472,842 | 9/1984 | Jarrett | 4/490 |
| 4,487,151 | 12/1984 | Deiana | 114/266 |
| 4,595,510 | 6/1986 | Winbladh et al. | 210/776 |
| 4,626,132 | 12/1986 | Allen | 405/71 |
| 4,996,936 | 5/1991 | Brundritt | 114/68 |
| 5,002,430 | 3/1991 | Smith | 405/66 |
| 5,051,029 | 9/1991 | Ecker | 405/68 |
| 5,056,957 | 10/1991 | Wood | 405/66 |
| 5,066,164 | 11/1991 | Tomosy | 405/66 |

FOREIGN PATENT DOCUMENTS

| | | | |
|---|---|---|---|
| 131897 | 6/1987 | Japan | 114/68 |
| WO80/01580 | 8/1980 | PCT Int'l Appl. | 405/66 |

Primary Examiner—Randolph A. Reese
Assistant Examiner—Arlen L. Olsen
Attorney, Agent, or Firm—Weingarten, Schurgin, Gagnebin & Hayes

[57] ABSTRACT

A system for containing oil or other contaminants which have leaked from an oil tanker or similar structure is disclosed. A protective housing surrounds the structure. A plurality of covers are each pivotably mounted at its upper edge to a lower outer edge of the housing to depend therefrom. Each cover is retained in a closed position with a lower edge of the cover adjacent the side of the structure to form a storage cavity defined by the cover, the housing, and a portion of the side of the structure. A series of interconnected collapsible float assemblies is contained within the storage cavity. In case of an oil leak, a triggering mechanism located within the housing sequentially releases the covers from the closed position and the float assemblies fall away into the water. In this manner a continuous curtain may be provided to surround the structure to prevent passage of all or most of the leaking contaminant. The housing and the hinged covers provide protection for the triggering mechanism and float assemblies contained therein from buffeting of waves and the like. The housing and covers also withstand docking procedures and function as a rub rail.

17 Claims, 19 Drawing Sheets

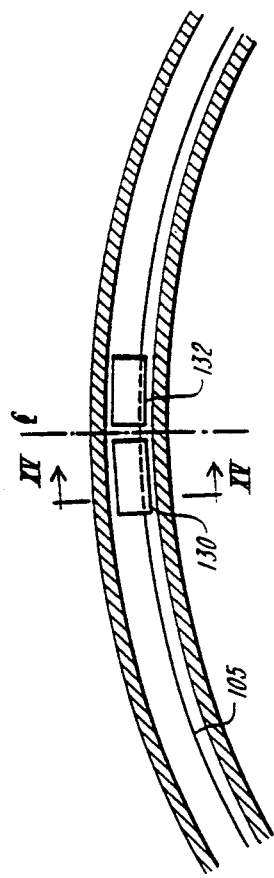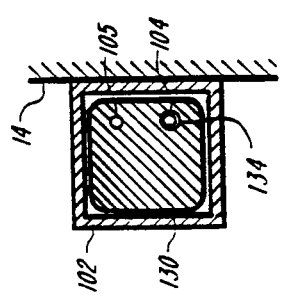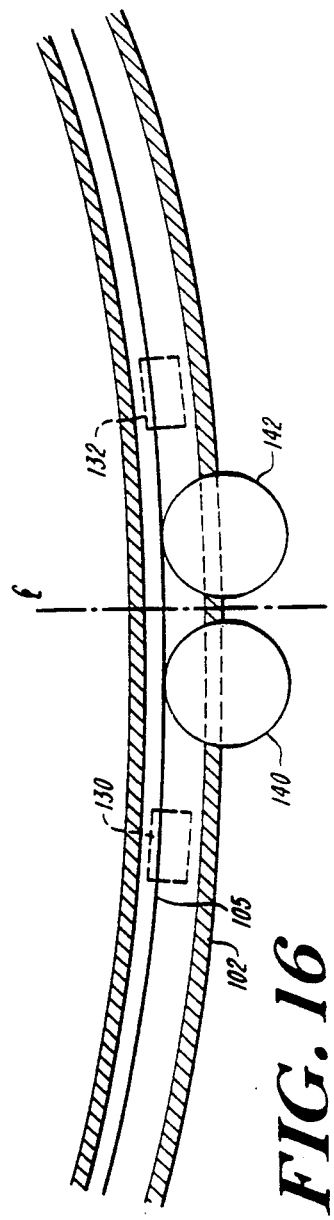

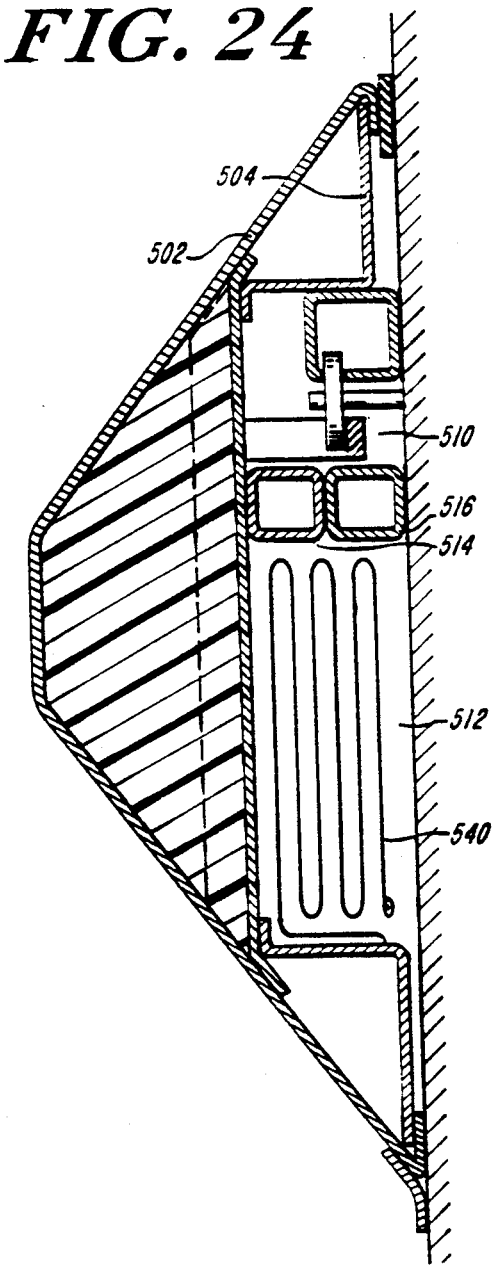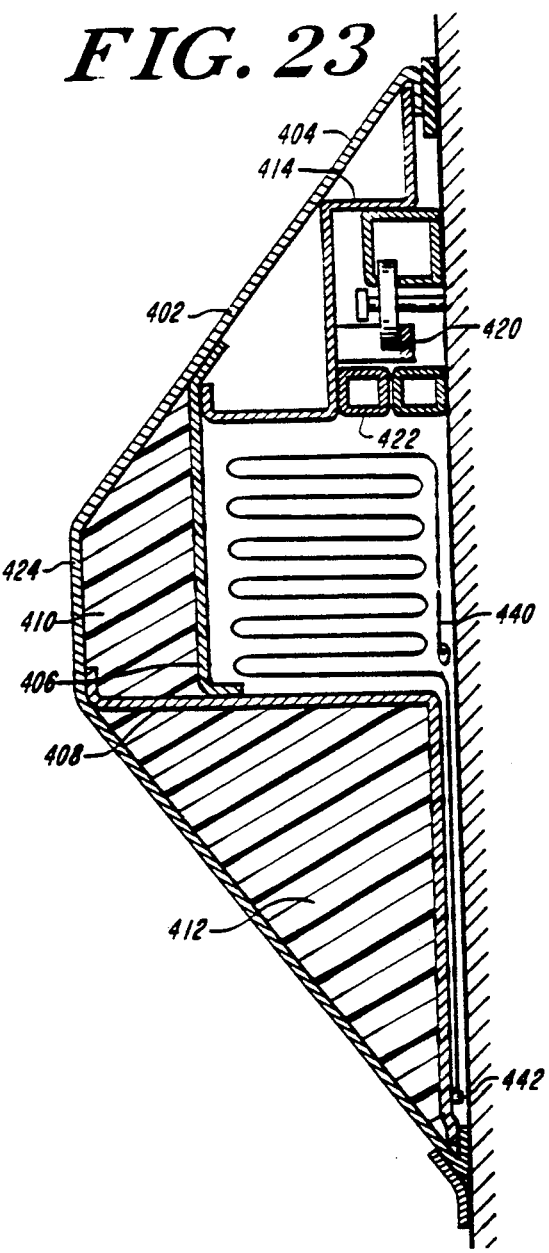

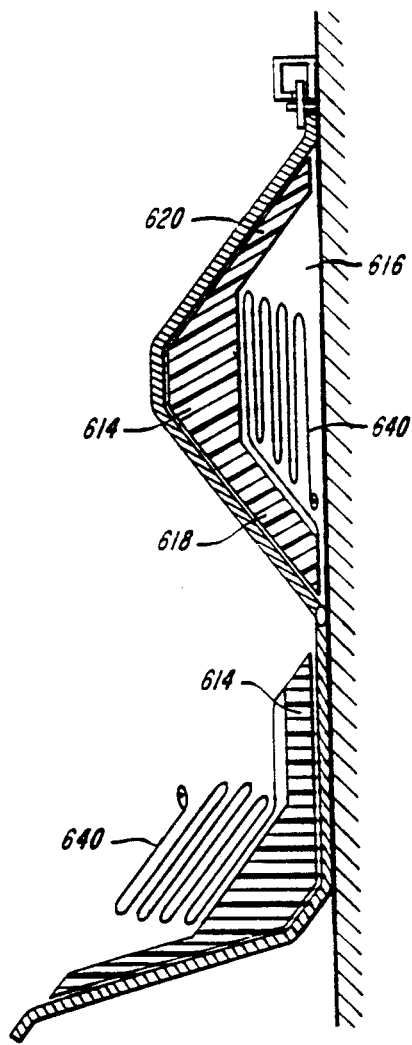
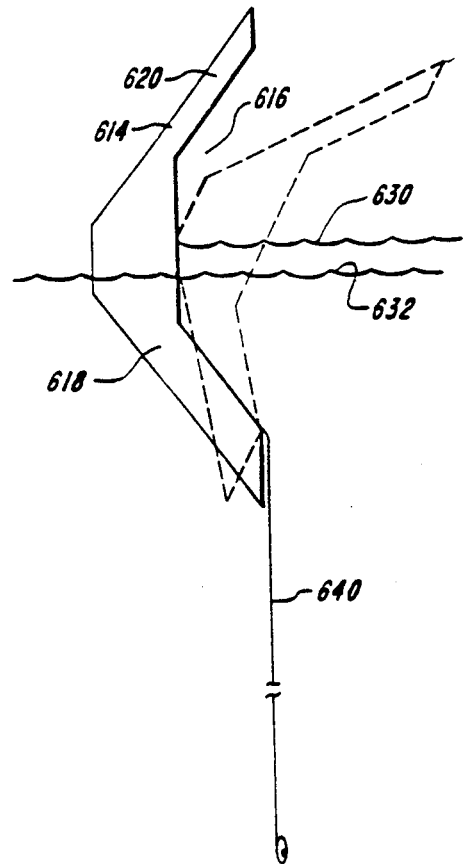
FIG. 26
FIG. 25

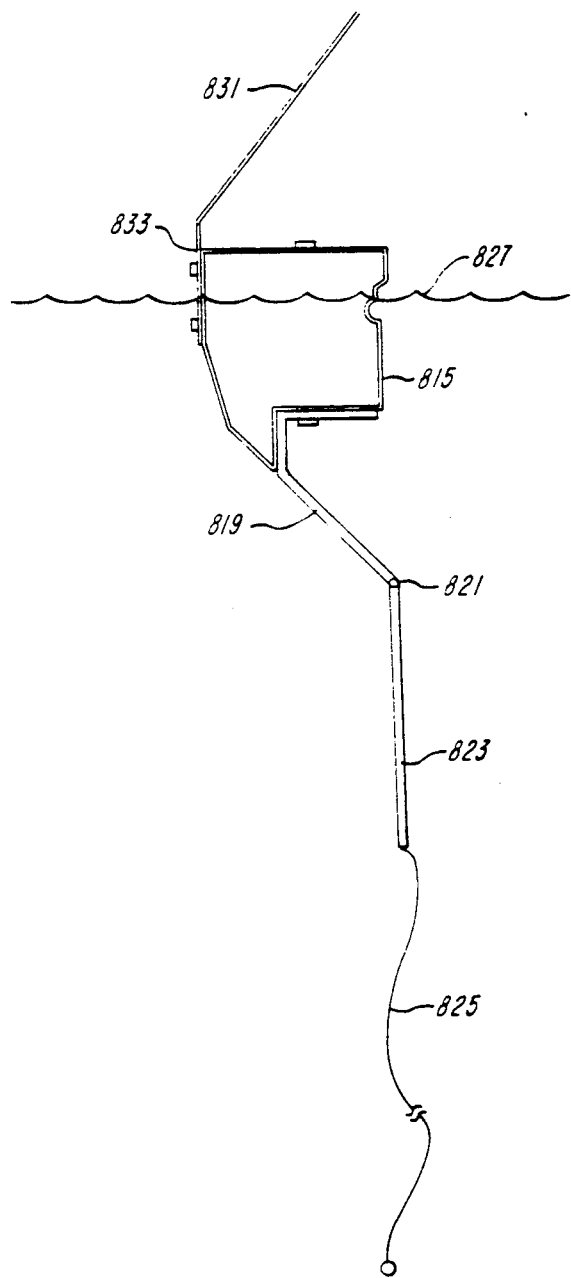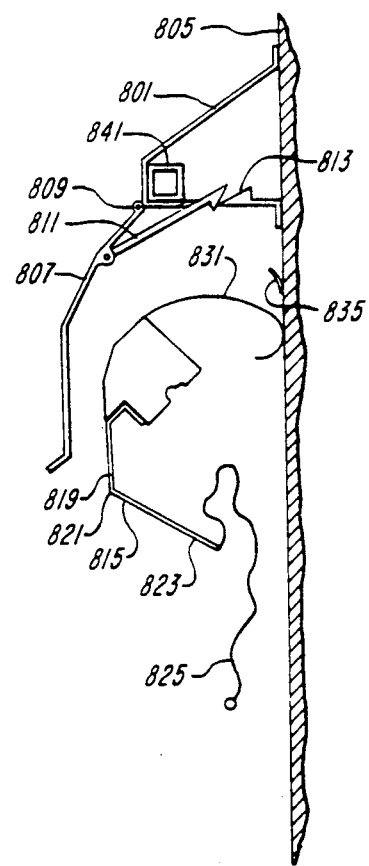
FIG. 29
FIG. 30

OIL CONTAINMENT SYSTEM FOR EMERGENCY USE

This application is a continuation-in-part of U.S. Pat. No. 5,002,430, issued Mar. 29, 1991 from U.S. patent application Ser. No. 07/546,392, filed Jun. 29, 1990, which is a continuation-in-part of U.S. Pat. No. 4,998,845, issued Mar. 12, 1991, from application Ser. No. 07/458,898, filed Dec. 29, 1989.

FIELD OF THE INVENTION

This invention relates to the field of hazardous materials and more particularly to systems for containing spilled contaminants.

BACKGROUND OF THE INVENTION

Leakage of contaminants, particularly oil, from oil tankers, offshore drilling platforms, or similar structures poses a serious environmental hazard. Various methods of cleaning up such spills have been devised. However, the longer the clean-up procedures take, the farther the spill travels from the ship. Consequently, the spill becomes even more difficult to clean up.

Devices are known to confine the spill to a manageable area. For example, oil fences comprising floats with curtains suspended from the floats have been used. Such a fence generally must be towed by tugboats until the fence surrounds the spill. A disadvantage to this approach is that time is lost getting the tugboats and the fence to the location of the spill.

Another solution has been to carry the fence on the oil tanker itself. However, previous devices of this nature take up room and are difficult to deploy.

SUMMARY OF THE INVENTION

The present invention provides an oil containment system for mounting on oil tankers or the like which takes up little room when stored on the tanker and is easily and rapidly deployable and maneuverable to contain a spill as soon as it occurs. In addition, the present oil containment system is readily mountable on the tanker and may be remounted for reuse.

A series of connectable flotation members are stored around the perimeter of the tanker. A membrane is folded and packed into a recess in each member and held between the member and the tanker. One edge of the membrane is attached to each flotation member while the opposite edge of the membrane is free. The members are held against the sides of the tanker by a releasable stay. In case of an oil leak, a triggering mechanism sequentially releases the stays to allow the members to drop off the tanker into the water. The free edge of the membrane falls from the canister so that the membrane forms a curtain in the water. Each flotation member is further connected to adjacent members by a flexible jacket and adjacent edges of each membrane are connected to each other. In this manner, a continuous curtain surrounds the tanker to prevent passage of most of the spilled oil. The curtain and/or the tanker may be maneuvered to best contain the spill. The curtain may be detached from the tanker and maneuvered to pinch off and isolate the spill from the tanker.

DESCRIPTION OF THE DRAWINGS

The invention will be more fully understood from the following detailed description taken in conjunction with the accompanying drawings in which:

FIG. 14 is a plan view of the system of FIG. 3 at the bow of a vessel;

FIG. 15 is a partial cross-sectional view along line XV—XV of FIG. 14;

FIG. 16 is a plan view of the system of FIG. 3 at the stern of a vessel;

FIG. 23 is a further embodiment of the present invention;

FIG. 24 is a further embodiment of the present invention;

FIG. 25 is a further embodiment of the present invention;

FIG. 26 is the embodiment of FIG. 25 in the deployed position;

FIG. 29 is a schematic view of the embodiment of FIG. 28 in the deployed configuration;

FIG. 30 is a schematic view of the embodiment of FIG. 29 during deployment;

DETAILED DESCRIPTION OF THE INVENTION

Figure 1:
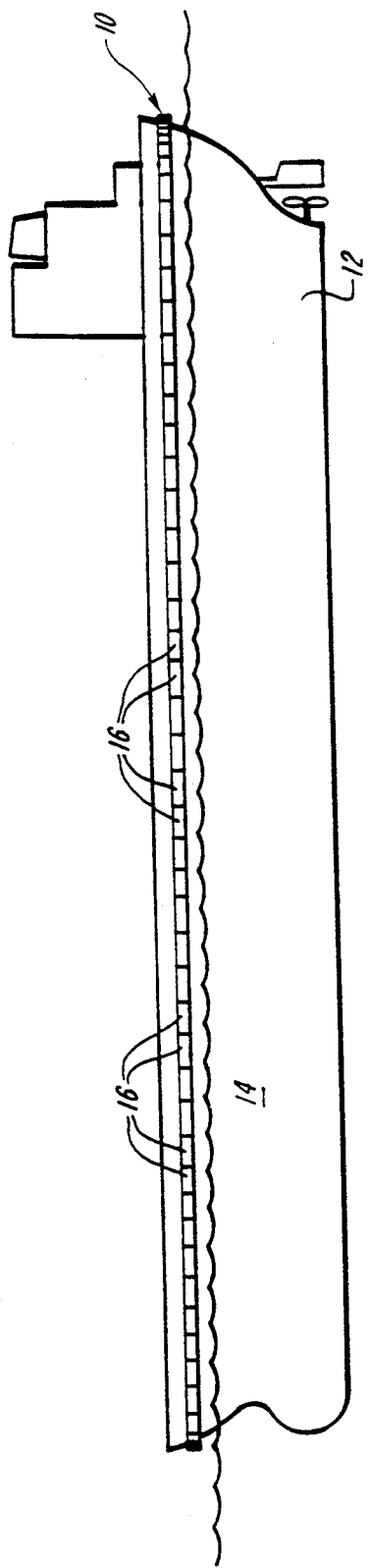
FIG. 1 is a side elevational view of an oil tanker illustrating the oil containment system of the present invention in its storage position on a tanker.
Figure 2:
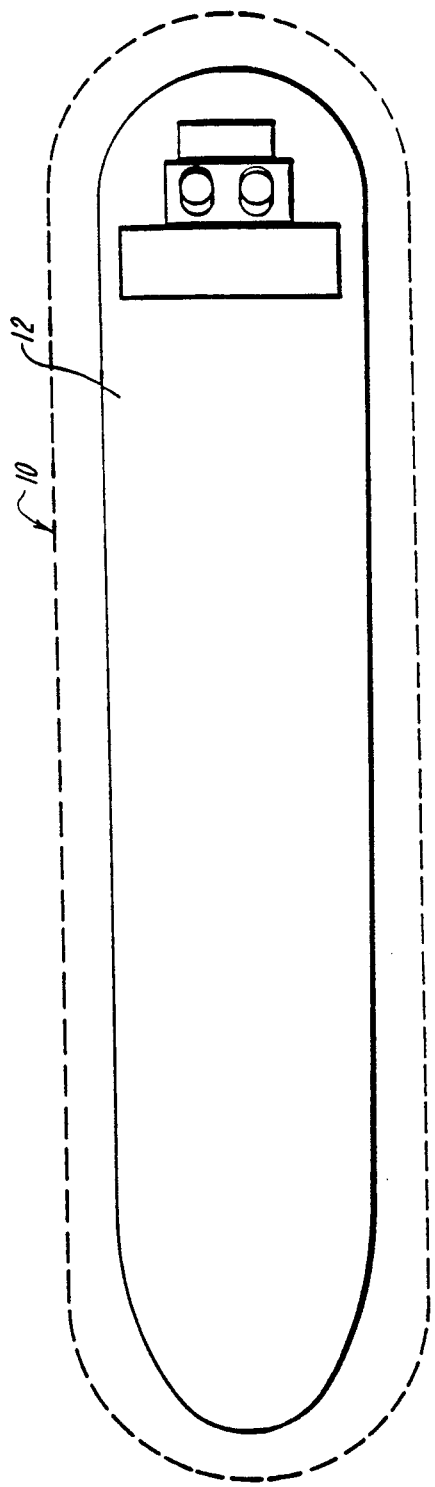
FIG. 2 is a top plan view of the tanker of FIG. 1 illustrating the oil containment system of the present invention in its deployed position in the water.

The invention is shown generally at 10 in FIGS. 1 and 2. The invention comprises floatable members 16 attached serially to surround an oil tanker 12. In the stored position, the floatable members are mounted to the sides 14 of the tanker as shown in FIG. 1. The invention is shown in its deployed position by the dotted line in FIG. 2. When deployed, flexible jackets interconnecting the floatable members expand the distance between each member so that the members are spaced away from the sides of the tanker. A membrane is attached to the floatable members and drops from the floatable members to form a continuous curtain in the water. In this manner, the invention forms a continuous boundary surrounding the tanker to contain the oil in the vicinity of the tanker.

The preferred embodiment of the present invention is shown more particularly in FIGS. 3-16. The floatable members comprise canisters 30 arranged serially end to end, as shown in FIGS. 8 and 10. The canisters preferably are made of stainless steel for good water and corrosion resistance, although any other suitable material, such as polyvinyl chloride, or composites of materials, including a durable coating of materials such as stainless steel or polyvinyl chloride, may be used.

Figure 4:
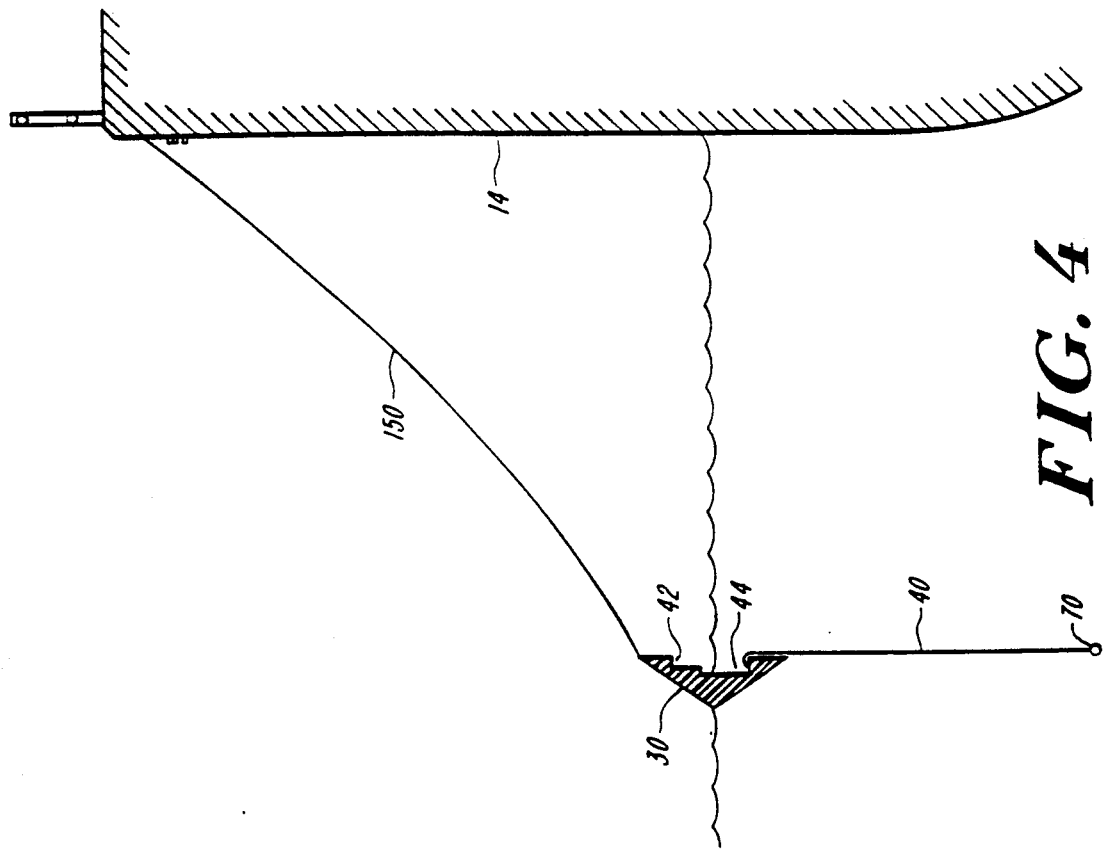
FIG. 4 is a further partial cross-sectional view of the system illustrated in FIG. 3 in the deployed position.
Figure 3:
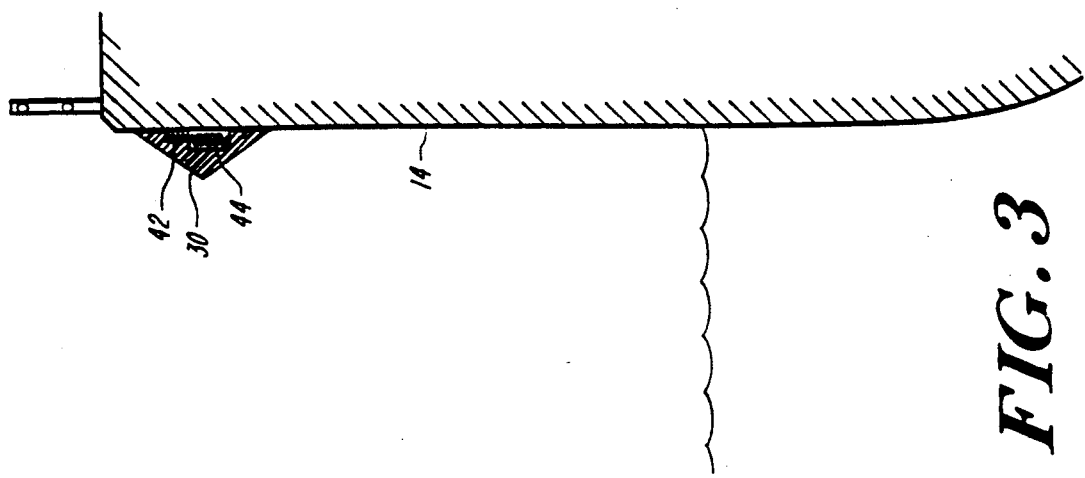
FIG. 3 is a partial cross-sectional view of the oil containment system of the present invention in its storage position.

Each canister has a generally triangular cross-sectional shape with two recessed areas 42, 44 in one face, as shown in FIGS. 3 and 4. The upper recessed area 42 contains a securing mechanism for securing the canisters to the tanker and a triggering mechanism for releasing the canisters from the tanker, to be more fully described below. The lower recessed area 44 forms a membrane storage recess, also to be more fully described below.

Figure 22:
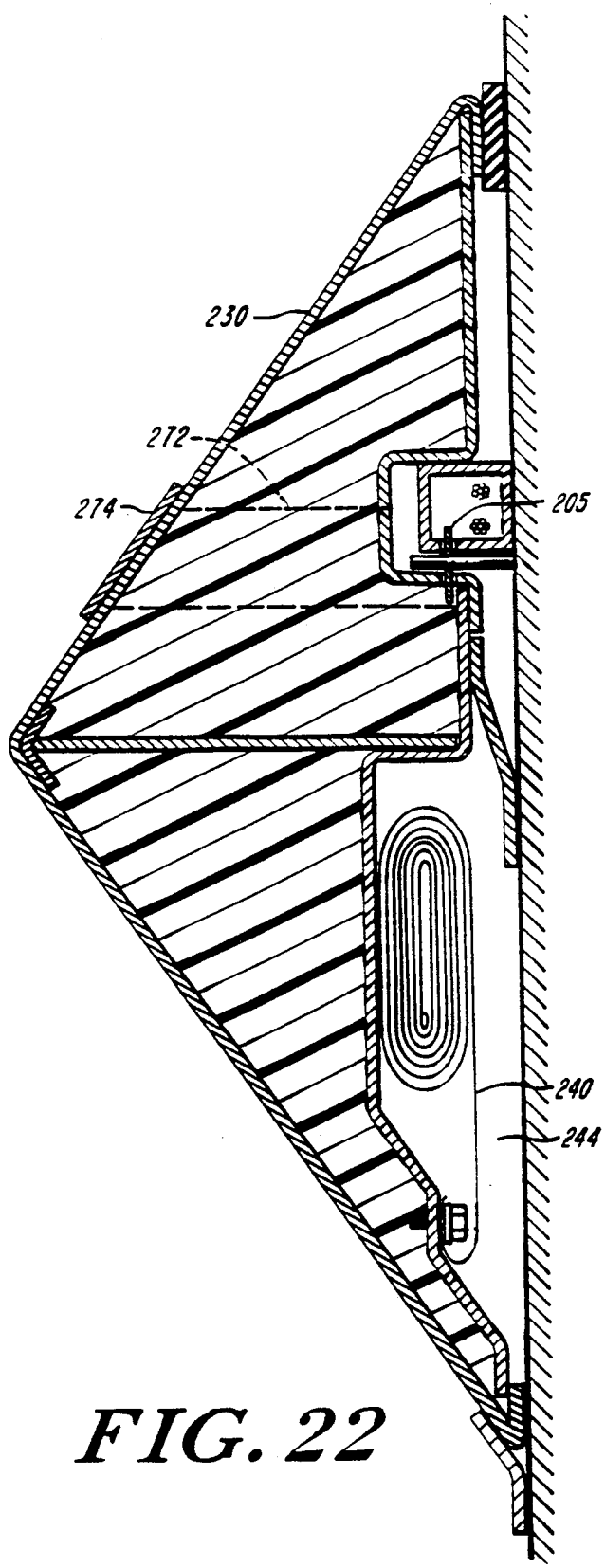
FIG. 22 is a cross-sectional view of a further embodiment of the present invention.

The canister may be readily formed from plates or sheets of stainless steel bent to a suitable shape and joined by welding or any other suitable manner known in the art to form a water-tight seal. In the embodiment shown in FIG. 5, four plates 33, 35, 37, 39 are used. Internal bracing members 43, 45, 47 may be provided to strengthen the canisters. Additionally, the plates may include extended elements to provide further strengthening, such as element 41 of plate 35, and element 46 of plate 39. Other canister configurations, such as, for example, the configurations shown in FIGS. 22-24, are contemplated by the invention.

Figure 6:
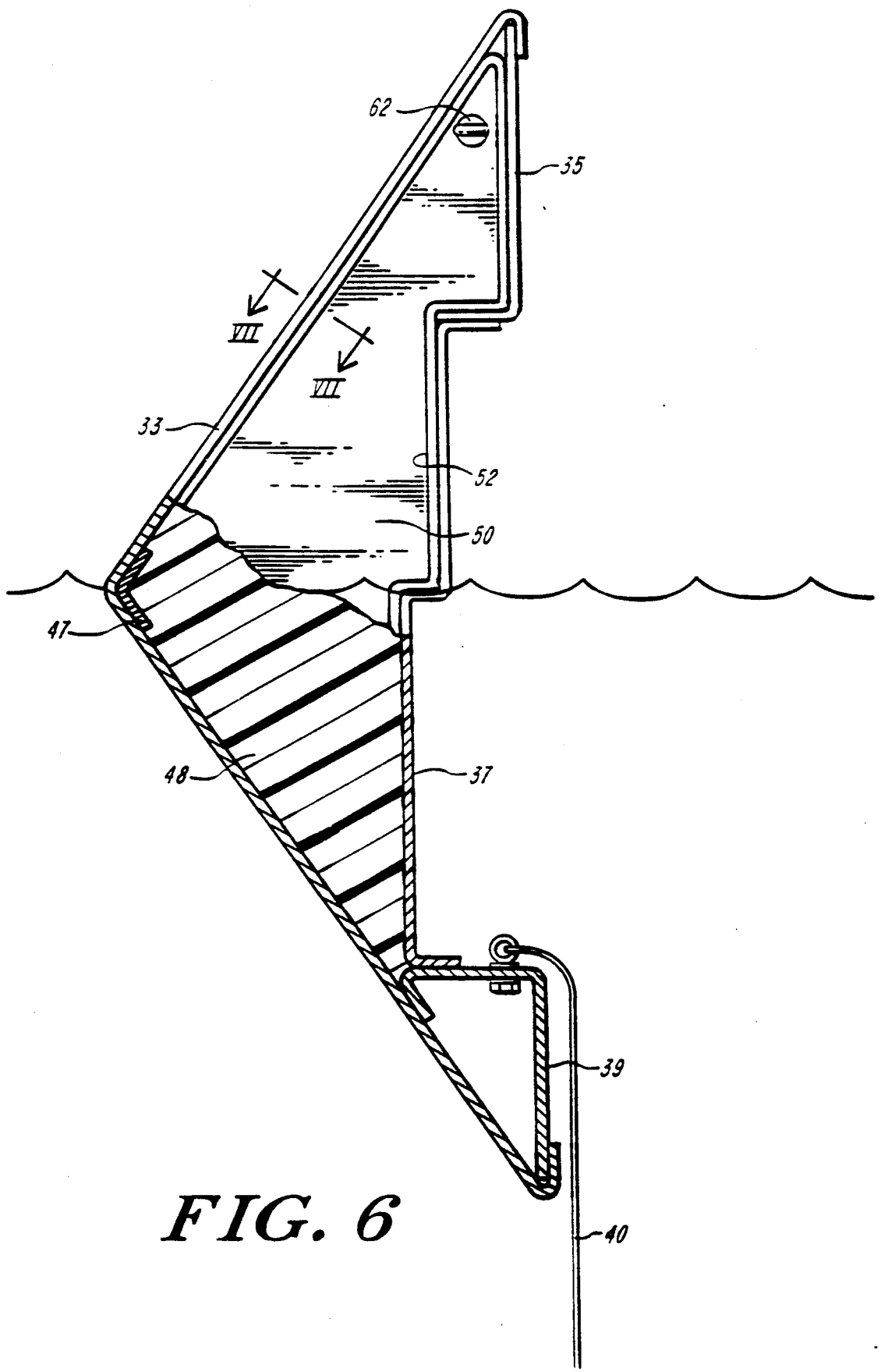
FIG. 6 is a side elevational view of the system of FIG. 5 with a portion cut away.
Figure 7:
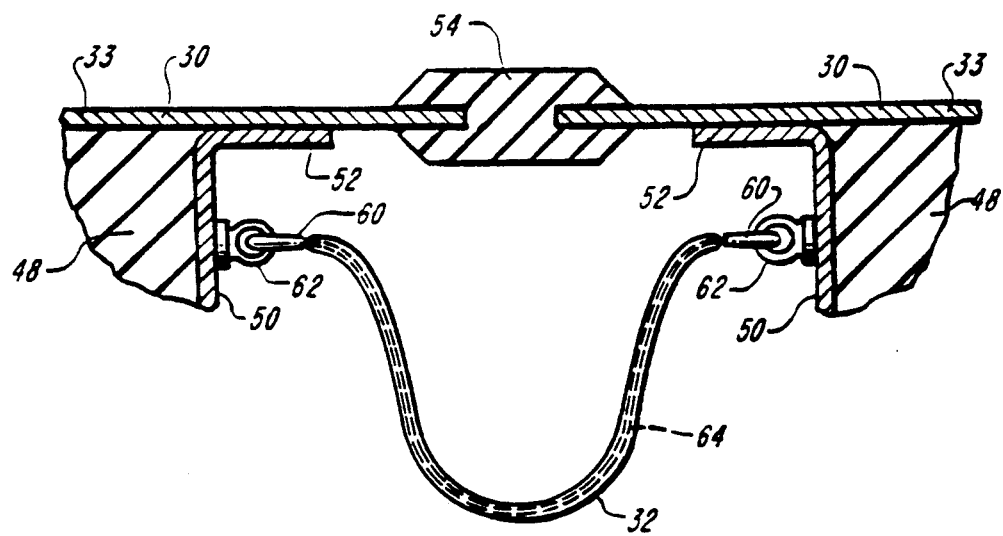
FIG. 7 is a cross-sectional view along line VII—VII of FIG. 6.
Figure 8:
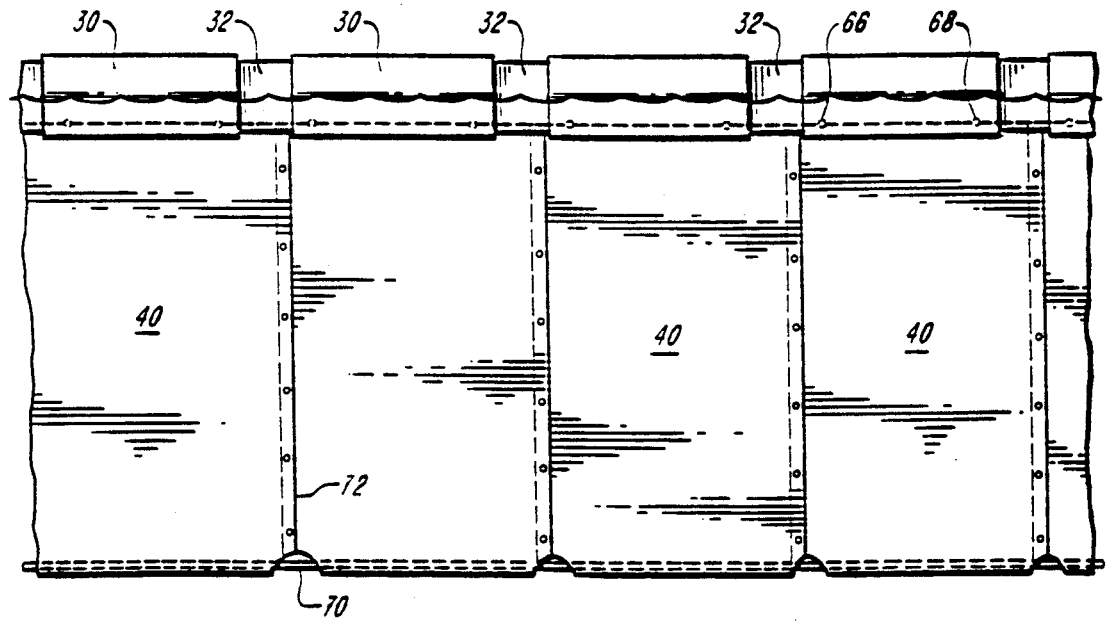
FIG. 8 is a side elevational view of the system of FIG. 3 in the deployed position.

End caps 50, formed to fit the cross-sectional shape of the canister, may be welded or otherwise joined to close off the ends of each canister, as shown in FIGS. 6 and 7. Cap 50 preferably includes a lip 52 extending around its perimeter to fit against the plates 33, 35, 37, 39. A suitable flotation material 48 such as a closed cell foam, to aid in strengthening the canister and in preventing damage from leakage, is preferably inserted into the cavity or cavities of each canister formed by the plates and end caps.

Plate 33 preferably extends beyond each end cap 50, as shown in FIG. 7. Gasket 54 provides a seal between adjacent canisters when the canisters are in the storage position. This gasket preferably is securely fastened to one of the canisters and pulls off the adjacent canister during deployment.

Figure 9:
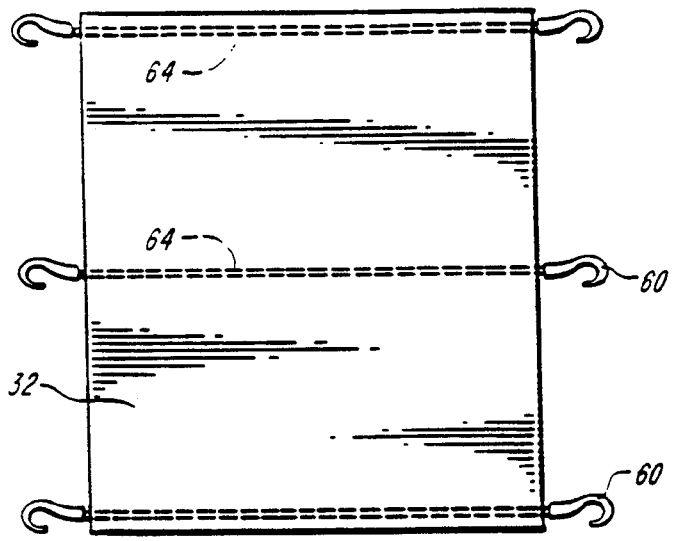
FIG. 9 is a side elevational view of a jacket employed in the system of FIG. 7.
Figure 10:
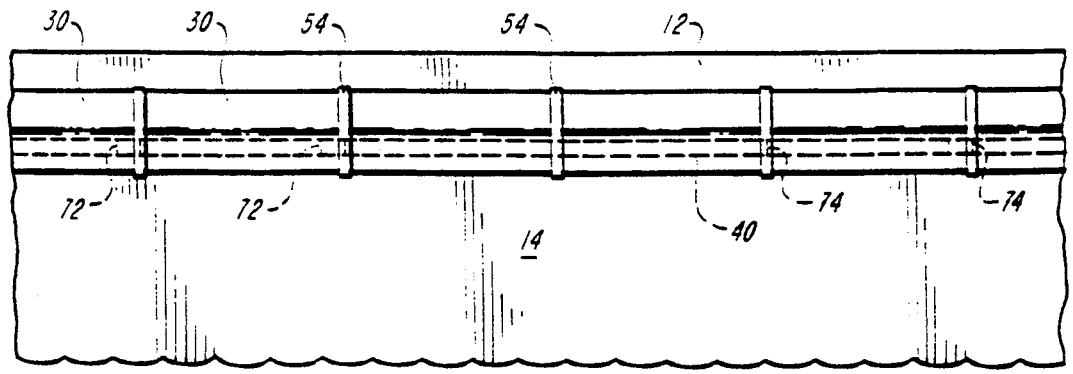
FIG. 10 illustrates a section of the present invention in the storage position.

Flexible jacket 32 spans the gap between adjacent canisters 30, as shown in FIGS. 7 through 9. The jackets form a continuous barrier between canisters when they are deployed. Hooks 60, crimped closed, fasten the jacket to eyes 62 on end caps 50, although the jacket may be fastened in any other suitable manner. Cables 64 are provided within the jacket and extend between the hooks. When the system is stored, the jackets are slack. When deployed, the slack in the jackets is taken up, allowing the distance between adjacent canisters to increase so that the system may be spaced away from the tanker to encompass a larger volume of contaminant. Cables 64 bear the load exerted by the canisters when deployed. Each canister may additionally be connected to adjacent canisters by a short cable link (not shown) as a safety measure.

A membrane 40 is attached to each canister 30 along its upper edge. A cable or chain 70 is generally encased along the bottom edge of the membrane. Preferably, a single sheet of membrane is attached to each canister and extends slightly beyond one end of the canister, as shown in FIGS. 8 and 10. Adjacent membrane sheets are fastened along their vertical edges 72 in any suitable manner. Preferably, the membrane sheets are fastened with removable or releasable fasteners. Alternatively, one sheet of membrane may span several canisters before joining an adjacent sheet of membrane. Each membrane sheet may have a cut away area 76 to accommodate connections between adjacent cables or chains 70. Each membrane sheet is also fastened to each canister in any suitable manner, such as by fasteners at points 66, 68 as shown in FIG. 8. The membrane may be formed from any suitable geotextile known in the art. In an alternative embodiment, each membrane sheet may be integral with the jacket interconnecting two canisters.

Figure 5:
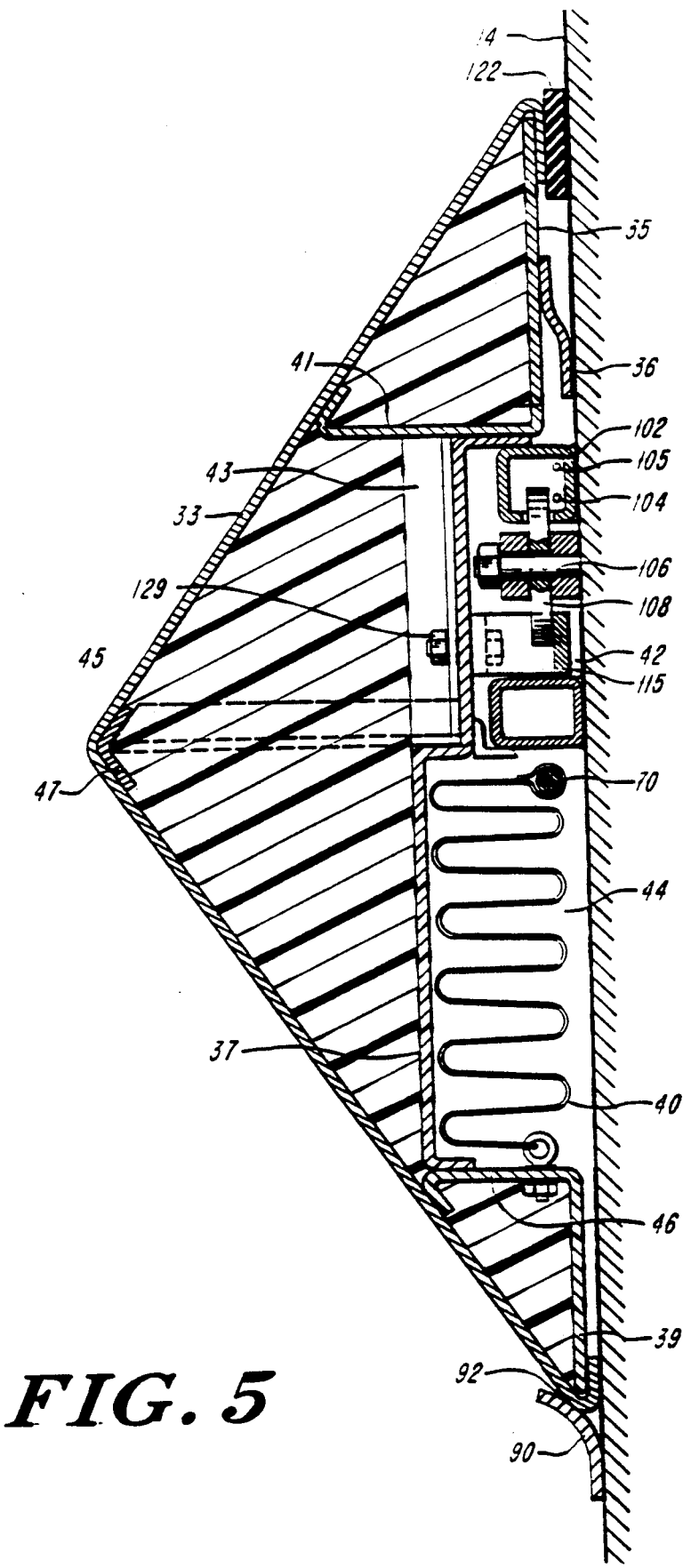
FIG. 5 is a partial cross-sectional view of the oil containment system illustrated in FIG. 3.

As shown in FIGS. 5 and 10, the membrane 40 is folded up with horizontal folds for storage within the recessed area 44 and held between canisters 30 and the side 14 of the tanker when the canisters are in the storage position. Since each sheet of membrane is longer than its associated canister to allow expansion of the membrane to its full length when deployed, the extension of the membrane sheet beyond the canister end is folded with two vertical folds, shown by dotted lines 72, 74 in FIG. 10, to fit compactly within the recessed area 44. If desired, a small section of the bottom edge of each membrane sheet may be left free of the cable or chain 70 to better accommodate this folding. In this manner, the stored membrane is readily deployable and protected from buffeting by waves.

Figure 18:
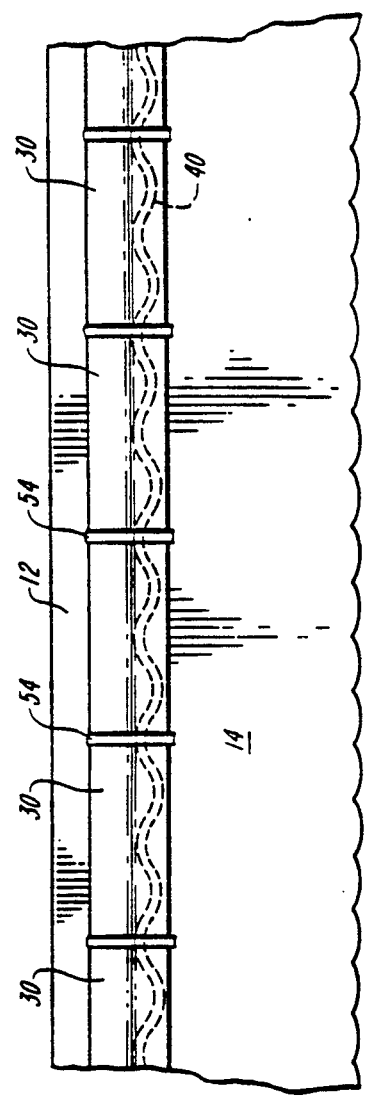
FIG. 18 is a partial elevational view of a further embodiment of the present invention.

In an alternative embodiment, the membrane 240 may be horizontally folded or rolled and inserted into the recessed area 244 with a sinuous or wavy shape, as shown in FIGS. 18 and 22. The recessed area is suitably sized to accommodate this sinuous shape.

When the system is deployed in the water, as shown in FIGS. 4 and 8, the membrane unfolds (or unrolls) and the vertical folds (or sinuous shape) flatten out so that the membrane can surround the tanker at a distance spaced away from the tanker. The canisters 30 float on the surface and the membrane 40 is suspended from the canisters Weights (not shown) may be provided on the bottom edge of the membrane if desired, but the weight of the membrane 40 and the encased cable or chain 70 is generally sufficient, so that such weights are not necessary.

The canisters 30 preferably are mounted slightly below the level of the deck of the tanker to be as far removed from the buffeting of waves as practicable. As shown in FIG. 5, angled seating members 90 may be welded at intermittent locations along both sides 14 of the tanker's hull. The bottom 92 of each canister 30 rests in these seating members. These seating members preferably are spaced so that one seating member supports the ends of adjacent canisters.

Figure 11:
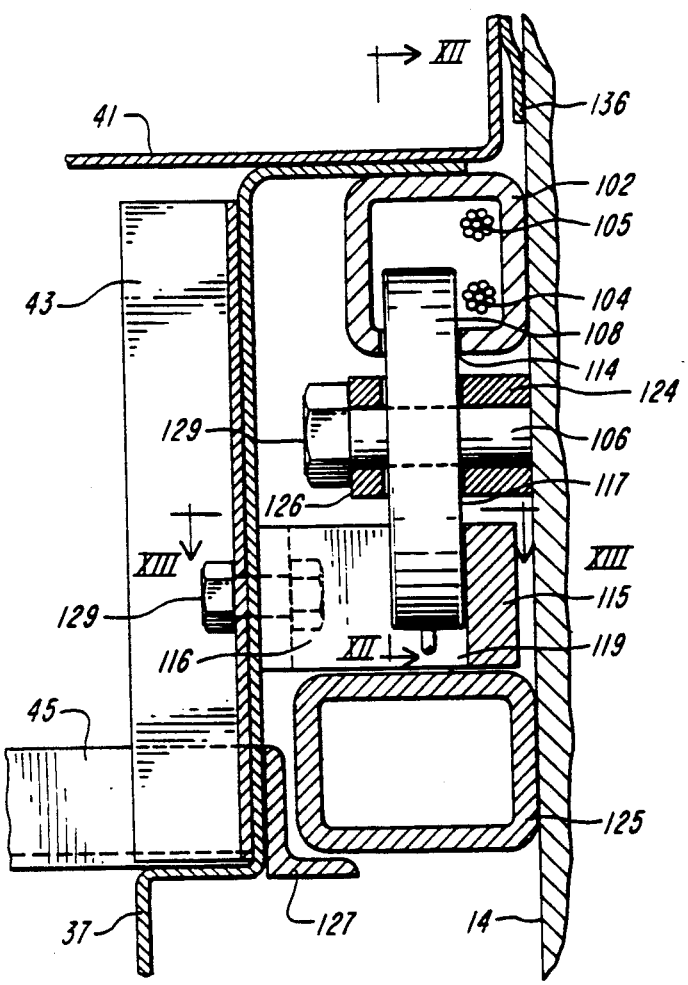
FIG. 11 is a cross-sectional view of a securing and triggering mechanism employed in the system of FIG. 5.
Figure 13:
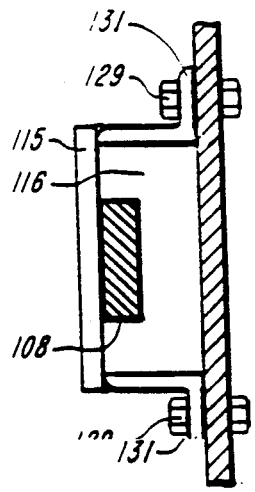
FIG. 13 is a plan view along line XIII—XIII of FIG. 11.

The canisters are secured to the hull by a mechanism mounted within the recessed area 42. As shown in FIGS. 5 and 11, a conduit 102 is fastened to both sides 14 of the hull somewhat above the seating members 90 and positioned to fit within recessed area 42 of the canister. These conduits run the entire length of the tanker on both sides. A pin 106 is fastened to the side 14 directly below conduit 102 at intervals of generally twice per canister. Cam 108 is pivotally mounted on this pin. Enlarged head 120 of pin 106 and bushings 124, 126 are provided to prevent the cam 108 from slipping on the pin. As shown in FIG. 13, cam stays 115 are generally U-shaped brackets having two flanges 131 fastened to the canisters by bolts 129. Each cam fits through an opening 114 in conduit 102 and an opening 116 in cam stay 115. Openings 114 and 116 are vertically aligned with one another. When the cams are inserted through these openings, the canisters 30 are held against the tanker hull in the storage position. Face 117 of cam 108 may be beveled slightly to more tightly engage with face 119 of cam stay 115 as the cam is rotated into opening 116. Additional bearing members 125, 127 may be provided to further support the canisters and prevent distortion by wave buffeting.

Figure 12:
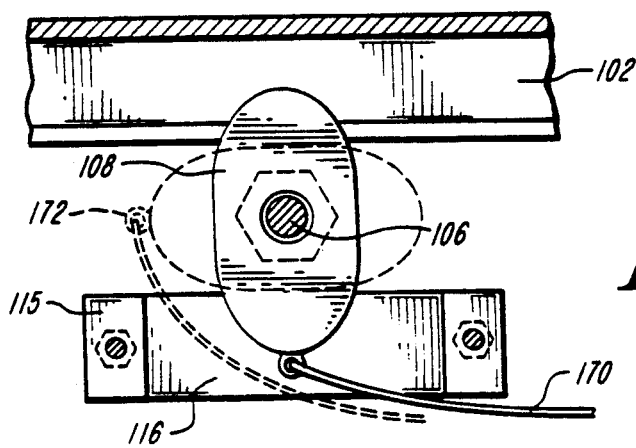
FIG. 12 is a cross-sectional view along line XII—XII of FIG. 11.

The canisters are mounted on the tanker hull by first placing the bottoms 92 into seating members 90. As shown in FIG. 12, a wire 170 is attached to each cam 108 by eye 172. Wire 170 extends through opening 116 in cam stay 115 out to the side of the canister. By pulling on wire 170, the cam is rotated into position to lock the canister against the hull, as shown by the dotted lines in FIG. 12. A gasket 122 may be provided along the sides of the hull at the top of the canister to minimize water running between the canister and hull and provide tension on the assembly to maintain it snugly against the ship.

An alternative embodiment for initially mounting the canister to the vessel is shown in FIG. 22. In this embodiment, cams 250 are rotated into position by a tool that reaches through an access port 272 provided in each canister 230. The access port may be protected by a cover 274.

The preferred embodiment of a triggering mechanism employed to deploy the system is shown in FIGS. 11 and 14-16. As shown in FIG. 14, conduit 102 extends around the bow of the tanker. Two pistons 130, 132 are carried in closely spaced alignment inside the conduit 102, one on each side of the ship. Cables 104, 105 are provided vertically adjacent to each other inside conduit 102 to surround the hull. Cable 104 is fastened to piston 132 and extends through a hole 134 in piston 130, as shown in FIG. 15. Similarly, cable 105 is fastened to piston 130 and extends through a hole in piston 132.

Conduit 102 extends around the bow of the tanker, as shown in FIG. 16. Motors 140, 142 are provided for pulling cables 104 and 105 respectively around the ship in a circuit. As each cable 104, 105 is pulled around, the piston to which the cable is connected is pulled through conduit 102. The piston hits each cam 108 sequentially and rotates the cam so that the cam is no longer inserted in opening 116 of cam stay 115, as shown by the solid line in FIG. 12. When the cams are in this position, the canisters 30 are no longer secured to the hull of the tanker and tend to fall away from the hull, dropping out of their seatings 90 and into the water. Leaf springs 136 provide an additional force tending to rotate the canisters 30 away from the hull. In this manner, the canisters are deployed sequentially, beginning at the bow of the tanker and ending at the stern. Specially formed flexible jackets and floats preferably are provided to cover the bow and stern assemblies and connections are provided to the port and starboard assemblies.

Figure 17:
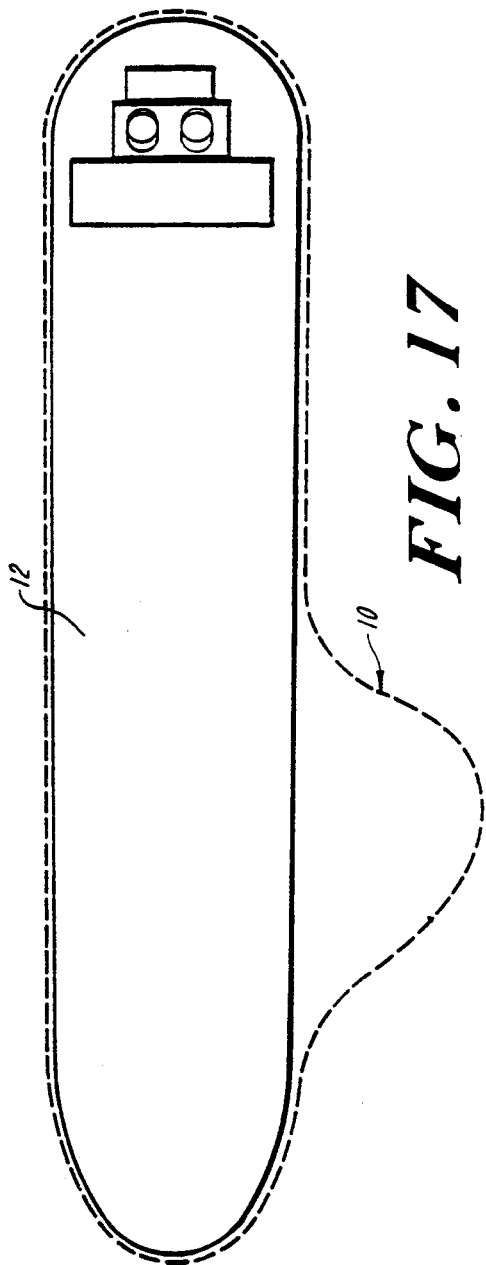
FIG. 17 is a plan view of the system in the deployed position.

When the system is deployed in the water, additional cables 150' preferably are provided to loosely tether occasional canisters to the tanker, as shown in FIG. 4. These cables allow the deployed barrier to be maneuvered around the tanker for optimal performance. For example, as shown in FIG. 17, if the spill is discharging a greater amount of oil on one side of the tanker, the tethering cables on the opposite side can be pulled in to allow the barrier to expand on the side of the spill. Also, the tanker itself may be maneuvered so that the barrier expands on the side of the greatest amount of the spill or to place the spill on the leeward side of the tanker. Protective guards (not shown) may be installed to prevent propeller fouling.

Figure 20:
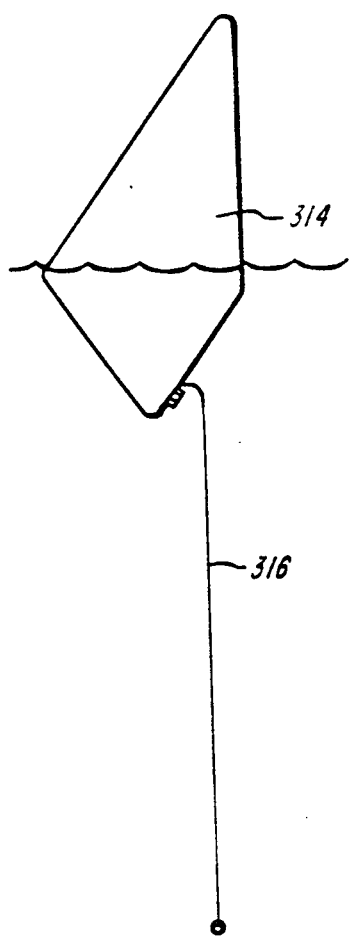
FIG. 20 is the embodiment of FIG. 19 in the deployed position.
Figure 19:
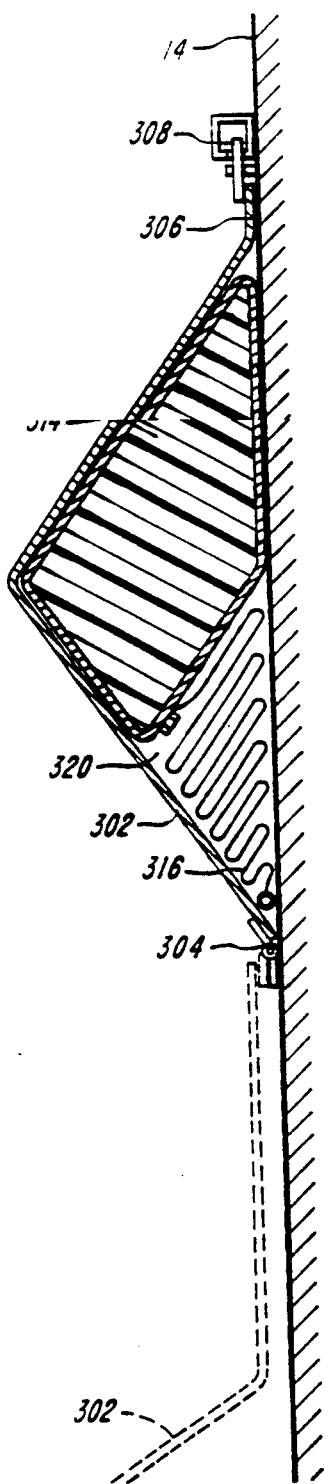
FIG. 19 is a further embodiment of the present invention in the storage position.
Figure 21:
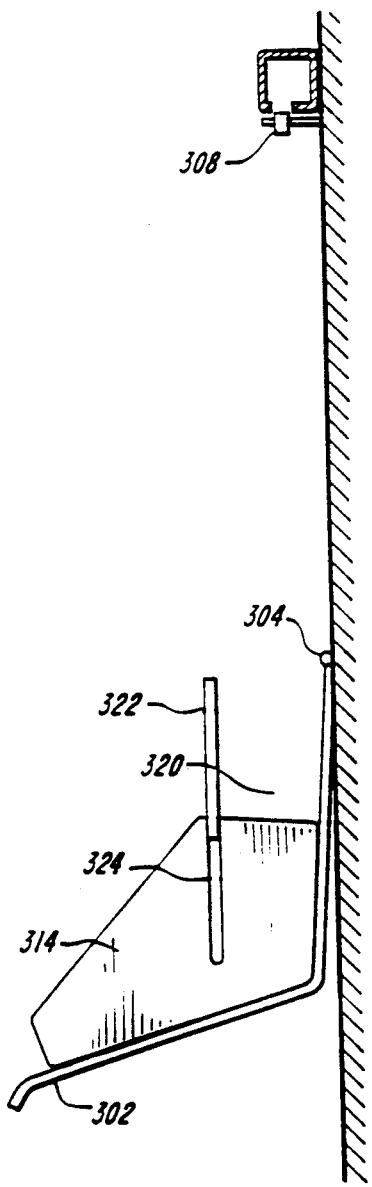
FIG. 21 is the embodiment of FIG. 19 during mounting into the storage position.

A further embodiment is shown in FIGS. 19-21. A triangular cover 302 is pivotably mounted to the side 14 of the vessel 12 at hinge 304. A plurality of such covers 302 extend the length of both sides of the vessel. At the upper end of cover 302 is lip 306. Cover 302 is held in the storage position by pivotable cam 308. Cam 308 is preferably similar to cam 108 and the triggering mechanism for releasing covers 302 is preferably similar to that described above. Covers 302 may be overlapped at their edges such that, when sequentially deployed, the first cover to be released laps over the next cover to be released.

Within cover 302 is contained float canister 314 and membrane 316 attached to canister 314. Membrane 316 is packed within storage area 320 in a manner similar to that previously described. As shown in FIG. 21, bars 322 removably inserted in tubular sockets or seatings 324 mounted on each end of each canister 314 aid in retaining the folded membrane in area 320 during mounting. Bars 322 may be removed as covers 302 are closed against the hull. When the system is deployed, cover 302 drops down, as shown by the dotted lines in FIG. 19, and canister 314 and membrane 316 drop into the water, as shown in FIG. 20. Float canisters 314 are preferably connected to one another with jackets such as jacket 32 described above.

A further embodiment is shown in FIG. 23. In this embodiment, canister 402 comprises sheets 404, 406, 408, which form two cavities 410, 412, which may be filled with a flotation material. Sheet 404 may also have a flat portion 424 to strengthen the canister. Bracing member 414 is provided on the upper portion of the canister to further strengthen the canister and reduce the weight. Several such bracing members may be provided on each canister. Cam stay member 420 and support member 422 may be mounted to the bracing members 424. Additionally, membrane 440 may be attached to the canister at point 442 near the bottom of the canister. This canister configuration tends to provide a lower center of gravity and increased stability in the water.

A further embodiment is shown in FIG. 24. This embodiment is also provided with intermittent bracing members 504 in the upper portion of canister 502. The securing and triggering mechanisms, which may be as previously described, are contained in area 510 and the membrane 540 is contained in area 512. Areas 510 and 512 are separated by support member 514 attached to the canister and support member 516 attached to the hull.

An additional embodiment, similar to the embodiment of FIGS. 19-21, is shown in FIGS. 25 and 26. The flotation member 614 has a generally triangular configuration with a recessed area 616 in one face for storage of membrane 640. The lower portion 618 of flotation member 614 is formed to be heavier or of greater density than the upper portion 620. The center of gravity of the member 620 is such that when deployed in the water, the member will tend to float in a position slightly tilted from an upright position as shown by the dotted lines of FIG. 26. Any contaminant 630 floating on the water surface 632, as shown in FIG. 26, or floating near the water surface, will provide a force tending to push the flotation member into the upright position, as shown by the solid line in FIG. 26. The recessed area 616 of flotation member 614 also further functions as a barrier to contain any contaminant.

The canister embodiments of FIGS. 3-16 and 22-24 also include recessed areas for membrane storage and for housing the securing and triggering mechanisms, as described above. The face having these recessed areas may also function as a barrier to contain any contaminants floating on or near the water surface, as described in connection with the embodiment of FIGS. 25 and 26. Additionally, the floatable canister may be configured with its center of gravity such that the canister tends to float in a position slightly tilted from an upright position and any contaminant floating on or near the water surface will tend to force the canister into a more upright position, as described in connection with embodiment of FIGS. 25 and 26.

Once the barrier is deployed surrounding the tanker, the movement of the spill is ascertained to determine the optimal method of containing the spill. For example, the barrier may be left in position completely surrounding the tanker and the barrier's position and orientation in the water may be controlled by tethers attached to the tanker, as shown in FIG. 17, or by movements of the tanker itself. In this manner, for example, the barrier may be guided to balloon out on the side of the spill to encompass a great volume of material without forcing the contaminant around the sides of the tanker. The tanker may be allowed to drift, may be anchored, or may be moved and steered, depending on conditions.

Additionally, the barrier may be detached from the tanker and guided to pinch off and isolate the spill or sections of the spill from the tanker, as shown in FIGS. 27(a)-(d). This action is desirable if the spill has stopped or if additional containment systems or devices of any nature are available for further containment or clean up of the spill. Such isolation of the spill is also desirable if the spill is flammable or otherwise poses a hazard to the tanker personnel.

Figure 27A:
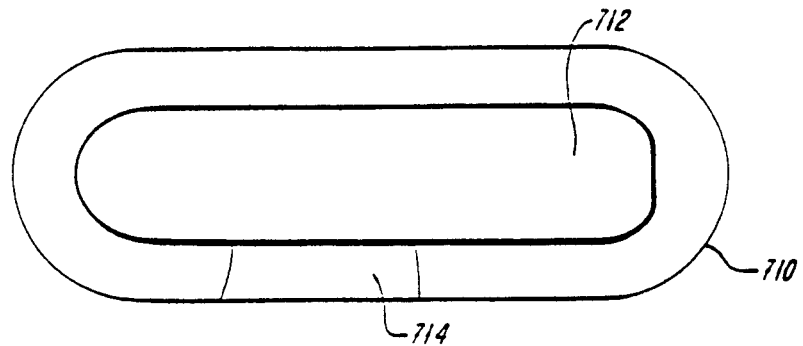
FIG. 27(a)–(d) illustrate a method of maneuvering the oil containment system of the present invention to isolate a spill.
Figure 27B:
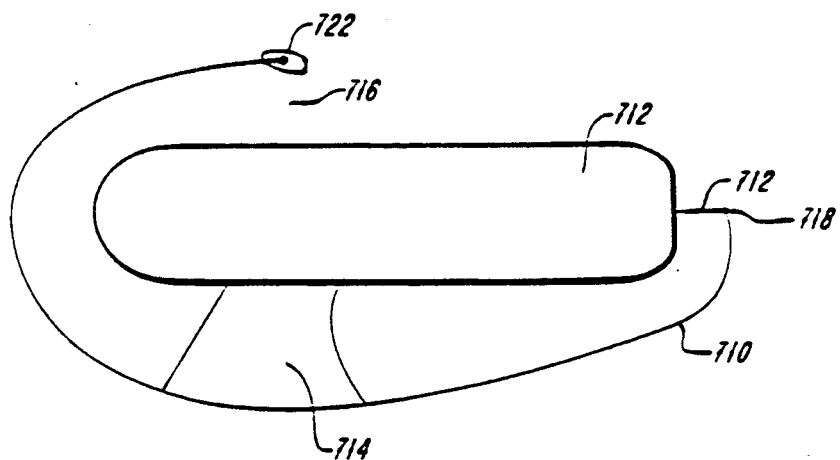
Figure 27C:
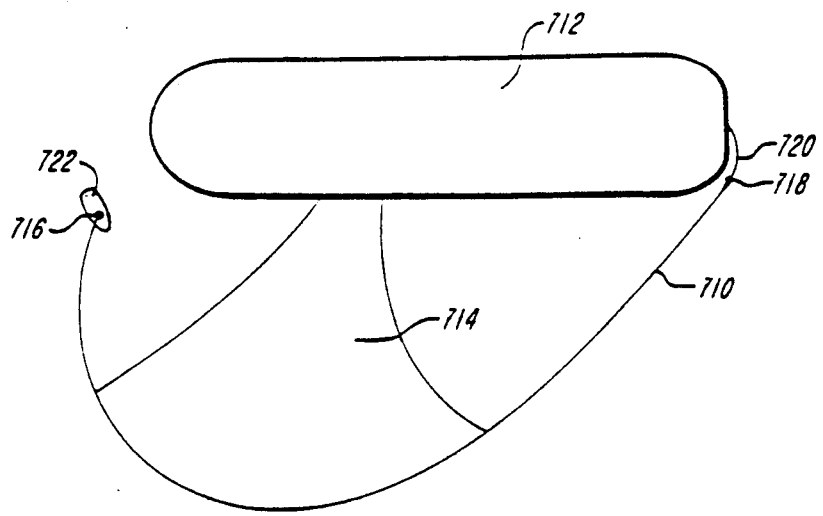
Figure 27D:
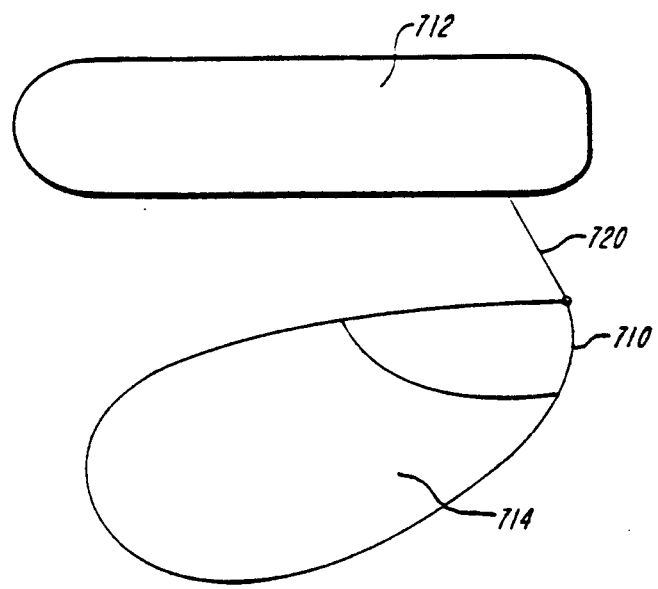
Figure 28:
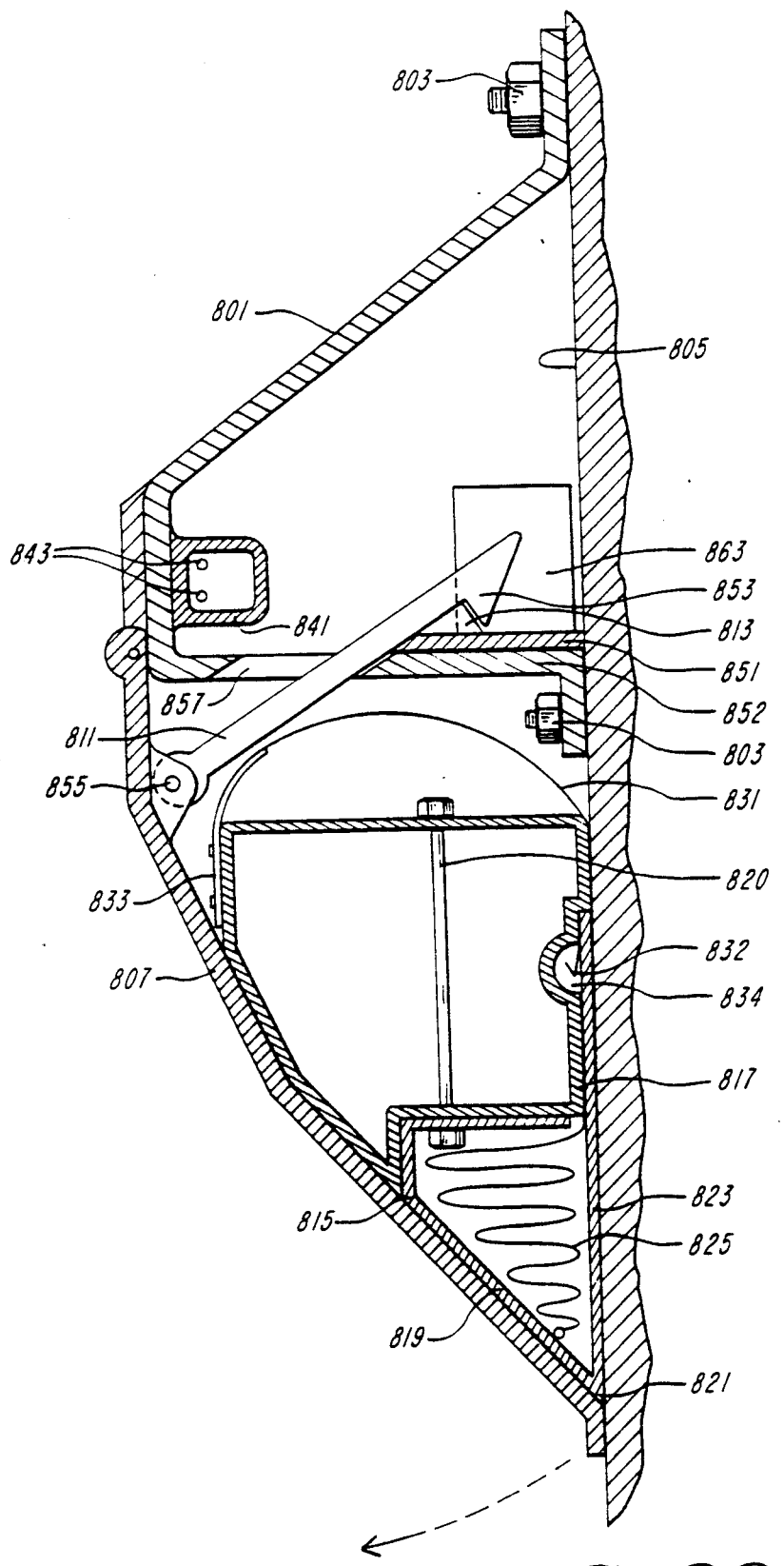
FIG. 28 is a cross-sectional view of a further embodiment of the present invention.
Figure 32:
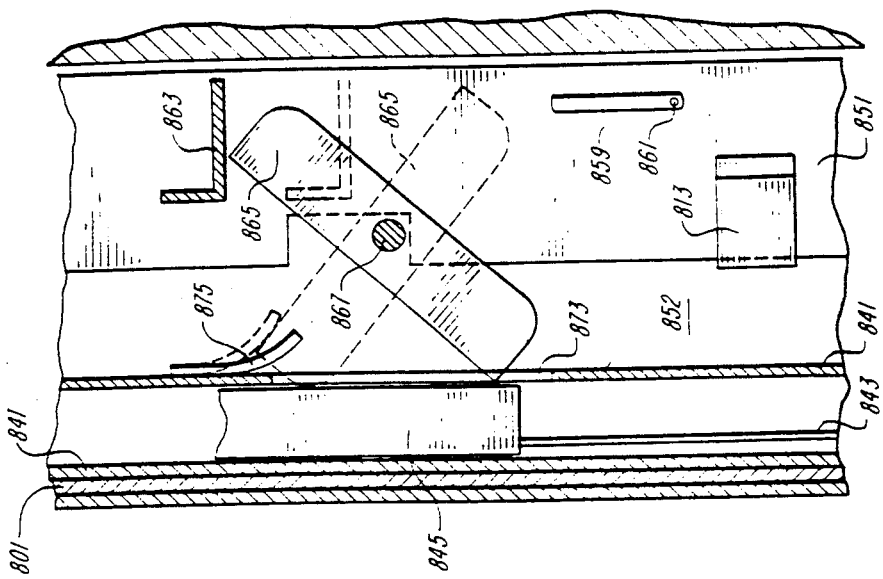
FIG. 32 is a cross-sectional view along line XXXII in FIG. 31.

In FIG. 27(a), the barrier 710 completely surrounds the tanker 712 and the spill 714 is discharging from one side of the tanker. In FIG. 27(b), the barrier is broken open to form two ends 716, 718. One end 718 is attached to the tanker, either directly or with a tether 720. A small boat 722 captures the other end 716 so that it may be maneuvered around the tanker 712. The captured end is maneuvered around the tanker opposite the side from which the spill 714 is discharging. This maneuvering may be done by moving the small boat 722, by movements of the tanker 712, or a combination of both. Additionally, the small boat 722 may be remotely controlled if desired. As shown in FIG. 27(c), the boat 722 brings the captured end 716 of the barrier 710 around to the side on which the spill 714 is located, and the spill is maneuvered away from the tanker, either by naturally drifting away or by moving the tanker 712. The boat 722 with the captured end 716 of the barrier 710 pinches off the spill 714 to enclose it entirely within the barrier 710, as shown in FIG. 27(d). If the discharge of the spill from the tanker previously has been halted, the spill may be allowed to separate from the tanker before being encircled by the barrier as in FIG. 27(d). The encircled and isolated spill may then be marked with flags or other signaling devices for subsequent location and identification.

A further embodiment is shown in FIGS. 28-33. A housing 801 is mounted, for example by bolts 803 along upper and lower edges, to each side 805 of the tanker from bow to stern. The housing may be provided in suitable lengths and mounted to the sides of the tanker to form a substantially continuous housing. A plurality of covers 807 are hinged at hinges 809 adjacent a lower edge of the housing 801. The hinges 809 may be located at suitable intervals. Each cover 807 is held in the closed position by one or more hooked bayonets 811 which latch on bayonet catches 813, to be more fully described below. Adjacent covers may overlap at their edges if desired, as described above.

When the cover 807 is in the closed position, it forms a storage cavity in which a float assembly 815 is retained adjacent the side of the tanker. Each float assembly is collapsible to fit within the storage cavity when in the stored position. Each float assembly comprises a float member 817, preferably formed as a hollow, watertight canister, and may contain a flotation material if desired. A bent lower plate 819 is attached to the float member 817, for example, by one or more bolts 820. A flap 823 is hinged to the plate 819 at a hinge 821 fixed at the lower end of plate 819. The plate 819 and flap 823 may be of any suitable length. A membrane 825 may be attached to the opposite end of the flap 823 if desired or needed for additional length. When the float assembly is retained against the tanker, the flap 823 is folded up between the float member 817 and the tanker side 805. When the float assembly is deployed, the lower plate 819 and flap 823 depend from the float member 817 below the surface 827 of the water.

A freeboard 831 extends above the float member 817. The freeboard preferably is formed as a flexible or resilient sheet and when deployed aids in preventing waves from splashing over the top of the float assembly. The freeboard may be attached to the float member in any suitable manner. A further plate 833 may be provided for strength. In storage, the freeboard is curved around the top of the float member and its free edge 832 is tucked in a recess 834 along the face of the float member. The freeboard may be bent near its free edge 832 to fit the contour of the float during storage and the edge may be further bent over for strength and safety, if desired. From the storage position, the freeboard may also act as a spring to propel the float assembly outward away from the tanker when the float assembly is deployed. A leaf spring 835 also may be mounted on the tanker side at suitable intervals to aid in propelling the float assembly away from the tanker during deployment.

The triggering mechanism for deploying the float assembly is preferably contained within the continuous housing 801. The triggering mechanism includes a conduit 841, which may be similar to the conduits described above, mounted to an inside wall opposite the side of the tanker. Cables 843 for drawing piston 845 through the conduit are run through the conduit, preferably in the manner described above.

The mechanism for retaining the hinged covers 807 in the closed position is shown in greater detail in FIGS. 28 and 31-33. A plate 851 is associated with each cover. Each plate is slidably mounted on the floor 852 of the continuous housing 801. A bayonet catch 813 is attached to the plate 851 at a location which corresponds with its associated bayonet 811. The bayonet catch has an angular surface conforming to the hook 853 on the bayonet to retain the bayonet on the bayonet catch. Each bayonet is hinged to the cover plate at hinges 855. Preferably, each cover is retained by a pair of bayonets and a corresponding pair of catches.

An opening 857 is provided in the floor of the continuous housing at the location of each bayonet so that the bayonet may extend therethrough. Preferably, the hook 853 is wider than the bayonet 811 and the opening 857 is of a width sufficient to allow the bayonet to pass through but to prevent passage of the hook 853, thereby limiting the bayonet's travel. In this manner, the bayonet is retained in a position to allow the bayonet to be readily rehooked. The bayonet is readily rehooked simply by pushing the hinged cover 807 closed, which pushes the bayonet up the bayonet catch until the hook drops over the angled face of the catch.

At least one slot 859 is provided in the slidable plate 851. A slide retainer bolt 861 is mounted to the floor of the continuous housing to protrude through each slot 859 to limit the path of travel of the slidable plate when the end of the slot reaches the bolt. The travel path of the slidable plate 851 is defined by the length of the slot.

A pusher plate 863 is attached in any suitable manner to the slidable plate 851. A cam 865 exerts a force on the pusher plate to cause the slidable plate 851 to slide along the floor 852 of the continuous housing. The cam 865 is rotatably mounted in the housing at a suitable position on cam shaft 867. The cam shaft 867 is mounted in a socket 869 on the floor of the continuous housing 801. The shaft protrudes through an opening at the top of the housing. A bolt head 868 rests on bearing surface 870 of member 872. Member 872 may also be joined to the housing to form a watertight seal if desired. Packing material may be placed within the cavity formed by the member 872 to aid in providing a watertight seal. A retainer 874 may also be provided around the shaft if desired.

Figure 31:
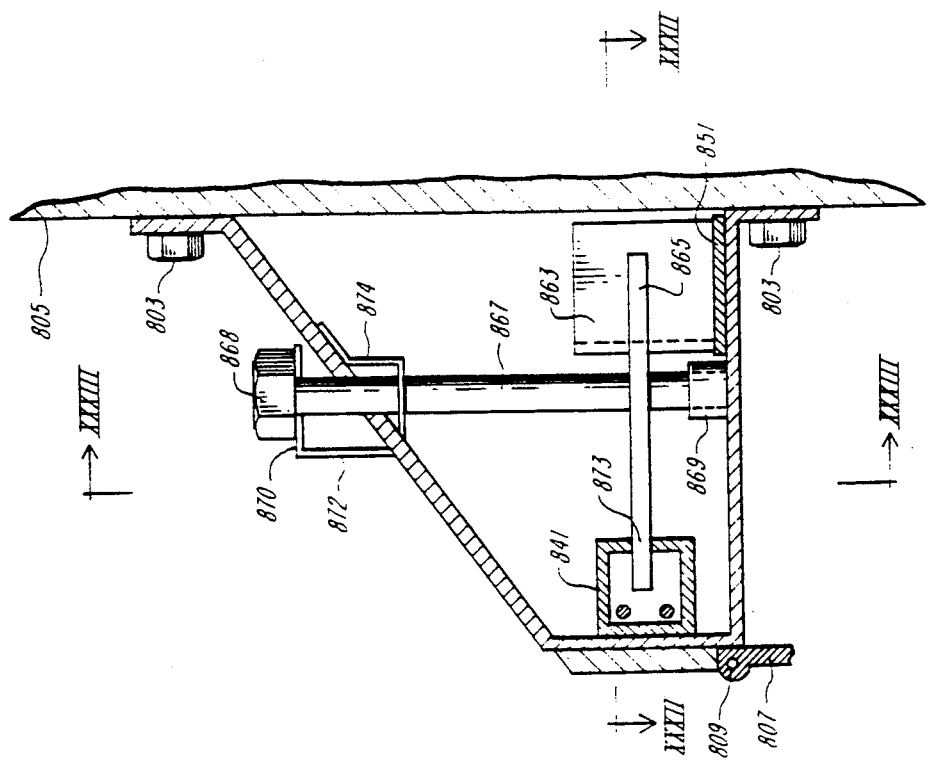
FIG. 31 is a further cross-sectional partial view of the embodiment of FIG. 28.
Figure 33:
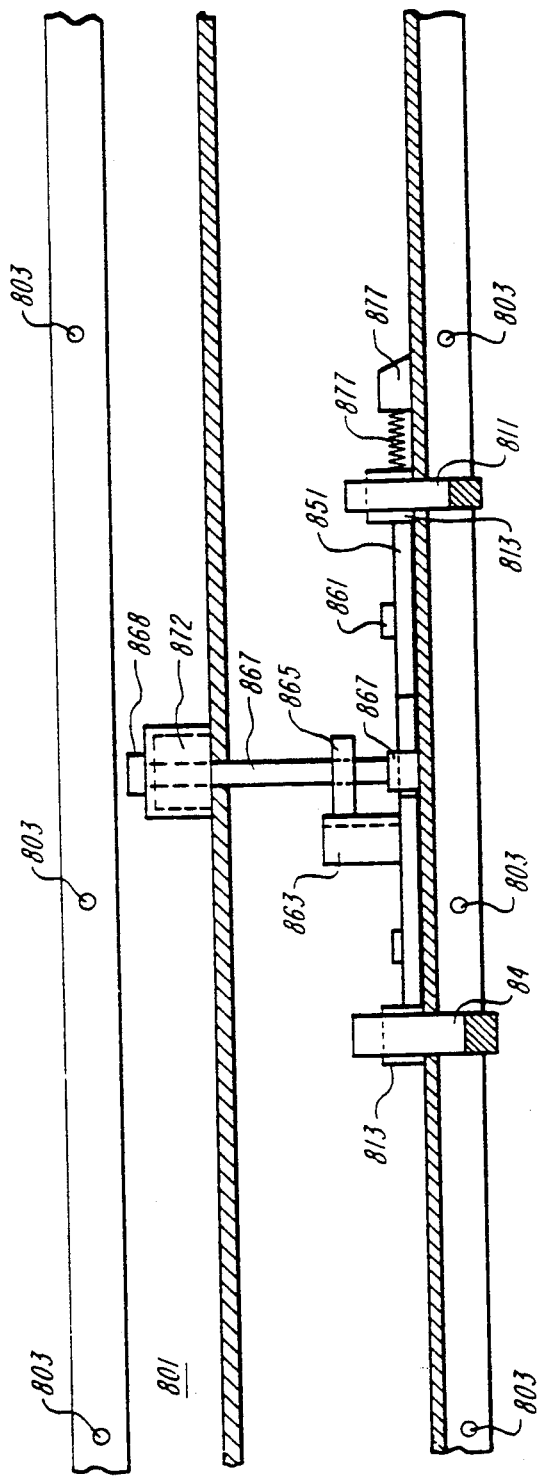
FIG. 33 is a cross-sectional view along line XXXIII in FIG. 31.

An opening 873 is provided in the conduit 841. The cam 865 extends into the opening when the float assembly is in the mounted position adjacent the tanker, as best shown in FIG. 31. An indicator mark on the head of the cam shaft depicts the rotational position of the cam.

To deploy the float assembly, the piston 845 is drawn through the conduit 841 as previously described. The piston strikes each cam 865 sequentially and rotates the cam such that one end of the cam pushes against pusher plate 863, thus pushing the slidable plate along a path as described previously. The bayonet catches 813 move, along with the plate, out of engagement with the bayonets 811, which fall in a generally downward and outward direction. The hinged cover plate 807 thereby falls to a more nearly vertical position, as shown is FIG. 30. The float assembly may then drop away from the ship into the water, as previously described.

A tension spring 877 mounted between a block 879 on the floor of the continuous housing and the end of the slidable plate 851 returns the plate to the original position. When the piston is retracted, it rotates the cam 865 beyond the locking position. A leaf spring 875 on the outside of the conduit ensures that the cam 865 returns to its locking position. A leaf spring may also be mounted on the floor of the housing to maintain pressure on the bayonet catch to ensure latching of the bayonet to the catch.

The housing and covers provide protection to the float assemblies and triggering and retaining mechanisms contained therein. The continuous housing 801 and covers 807 are preferably formed of heavy steel plate for structural resistance and strength. The housing and covers also function as a rub rail and withstand docking procedures.

When the float assembly is to be loaded or reloaded into the mounted position, the hinged cover 807 can be opened by applying a wrench to the bolt on top of the cam shaft 867. The hinge 809 attaching the cover 807 to the housing 801 is constructed to restrict the outward movement of the cover, which assists in maintaining the bayonets in a position to ensure ready relatching onto the bayonet catches.

Alternatively, the present invention contemplates the provision of the triggering and retaining mechanisms contained entirely or partially within the storage cavity defined by the hinged covers at a location below the float assembly. For example, the conduit may be mounted within a space provided between the hinged cover and the tanker side.

The invention has been described in relation to an oil tanker. However, the oil containment system of the present invention may be used with other structures, such as an offshore oil drilling platform, or any fuel powered vessel where the danger of contaminants leaking into water exists.

The invention is not to be limited by what has been particularly shown and described, except as indicated by the appended claims.

I claim:

1. A system for containing a contaminant leading from a structure into water surrounding the structure, comprising:
    a housing mounted along a side of the structure, the housing defining a housing cavity;
    at least one cover having an upper edge pivotably mounted to an outside lower edge of the housing to depend from the housing;
    releasable means for retaining the cover in a closed position with a lower edge of the cover adjacent the side of the structure to form a storage cavity defined by the cover, an outer wall portion of the housing extending between the outside lower edge of the housing and the structure, and a portion of the side of the structure;
    a float assembly collapsible to fit within the storage cavity; and
    means located within the housing cavity of the housing for releasing the cover from the closed position.

2. The system of claim 1 wherein the cover is formed with a generally arcuate configuration.

3. The system of claim 1 wherein the cover is mounted to the housing to depend therefrom with the lower edge of the cover spaced from the side of the tanker in an open position when the retaining means is in a released position, whereby the float assembly within the storage cavity falls out of the storage cavity.

4. The system of claim 3 further comprising means for limiting the outward extent of the distance the lower edge of the cover is spaced from the tanker when the cover is in the open position whereby the cover is readily closed and reopened.

5. The system of claim 1 wherein the cover retaining means includes a first latching member attached to the cover and extendible into the housing and a second latching member in the housing cooperatively engageable with the first latching member to retain the latching member in a latched position within the housing.

6. The system of claim 5 wherein the releasing means comprises a member for moving the second latching member out of cooperative engagement with the first latching member.

7. The system of claim 6 wherein the first latching member comprises a bayonet having a hooked tip and a base pivotally mounted to the cover.

8. The system of claim 5 wherein the releasing means comprises a slidable plate inside the housing, the second latching member being mounted on the slidable plate, and means for sliding the plate to move the second latching member out of cooperative engagement with the first latching member.

9. The system of claim 8 wherein the retaining means includes means for biasing the slidable plate in a position to hold the first and second latching members in cooperative engagement.

10. The system of claim 9 wherein the plate sliding means comprises a pusher member mounted on the slidable plate and a cam rotatably mounted inside the housing to engage the pusher member to push the plate against the biasing means.

11. The system of claim 1 wherein the float assembly comprises a flotation member, a boom structure dependent from the flotation member, and a flexible freeboard member extendible above the flotation member.

12. The system of claim 1 wherein the float assembly includes a pivotable flap member.

13. The system of claim 1 wherein the storage cavity is defined by a plurality of covers, each having an upper edge pivotably mounted to an outside lower edge of the housing to depend from the housing; and further including:
releasable means associated with each cover for retaining each cover in a closed position with a lower edge of each cover adjacent the side of the structure to form a storage cavity; and
a plurality of further float assemblies, each float assembly interconnected to adjacent float assemblies, each float assembly collapsible to fit within the storage cavity.

14. A system for containing a contaminant leaking from a structure into water surrounding the structure, comprising:
a housing mounted along a side of the structure, an upper cavity formed in the housing;
a plurality of covers, each having an upper edge pivotably mounted to an outside lower edge of the housing to depend from the housing;
releasable means associated with each cover for retaining each cover in a closed position with a lower edge of each cover adjacent the side of the structure to form a storage cavity below the upper cavity, the storage cavity defined by the covers, an outside surface of a floor of the housing extending between the outside lower edge of the housing and the structure, and a portion of the side of the structure;
a plurality of interconnected float assemblies, each float assembly collapsible to fit within the storage cavity; and
means located within the upper cavity of the housing for releasing each cover from the closed position.

15. The system of claim 14 wherein the releasing means is located within the upper cavity of the housing.

16. The system of claim 15 wherein the releasing means includes means for automatically sequentially releasing each cover.

17. The system of claim 14 wherein the structure is a ship and the housing is mounted continuously along each side of the ship.

* * * * *